Figure 1:
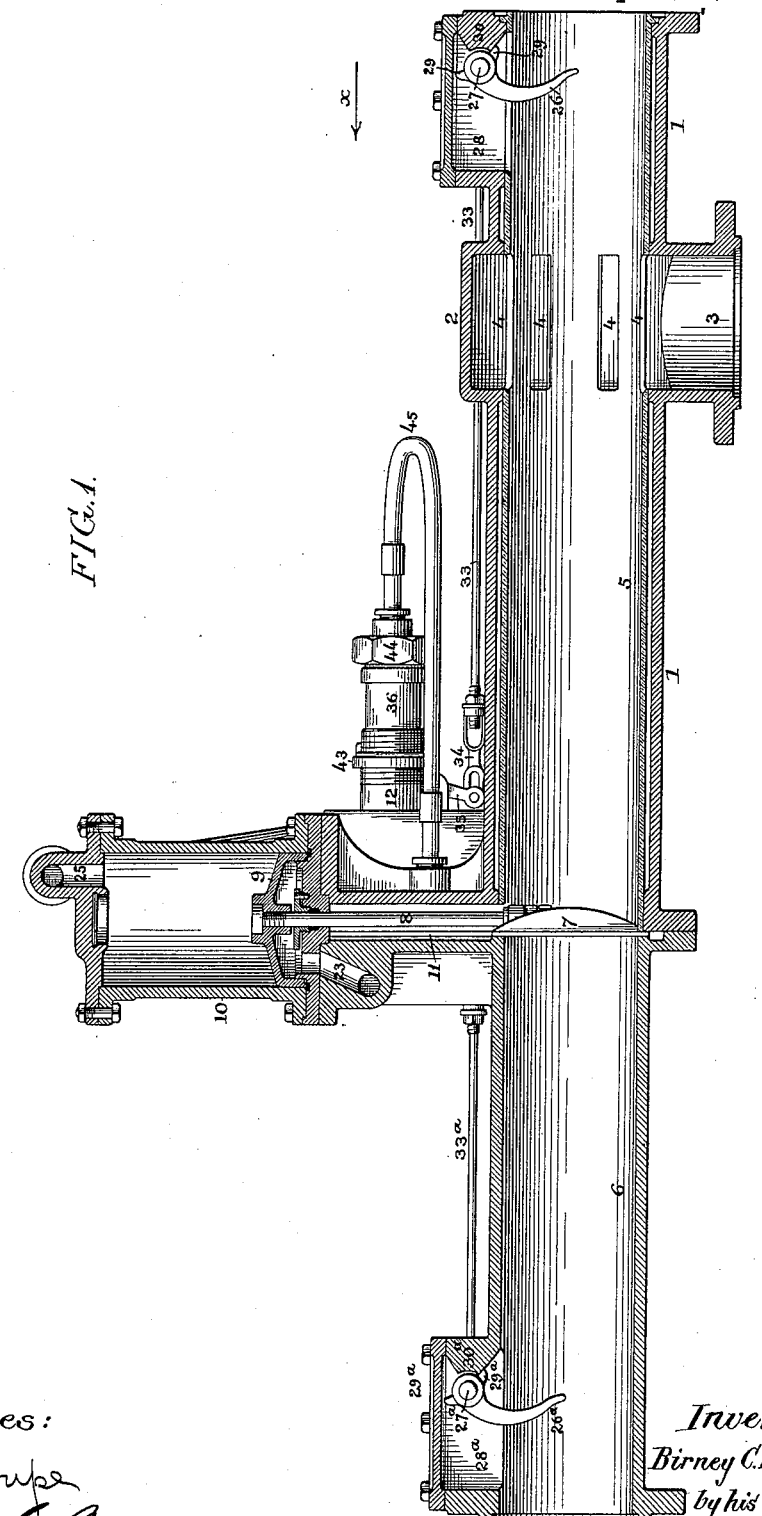

(No Model.)  3 Sheets—Sheet 1.

B. C. BATCHELLER.
VALVE MECHANISM FOR PNEUMATIC TRANSIT PIPES.

No. 568,291.  Patented Sept. 22, 1896.

Witnesses:
A. V. Groupe
Murray C. Boyer

Inventor:
Birney C. Batcheller
by his Attorneys
Howson & Howson

THE NORRIS PETERS CO., PHOTO-LITHO., WASHINGTON, D. C.

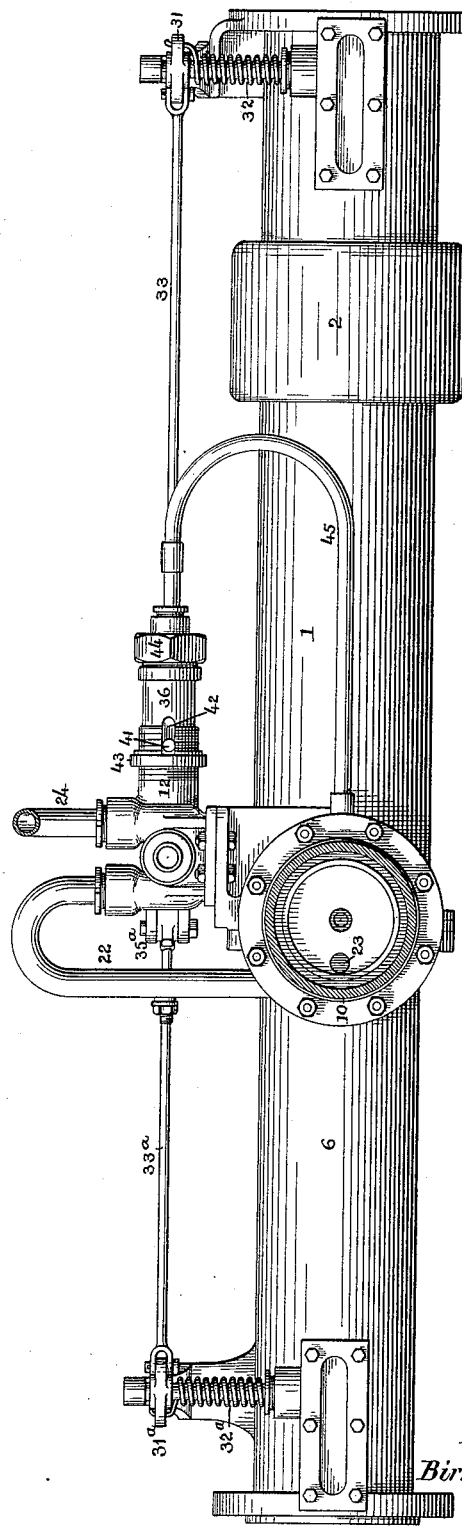

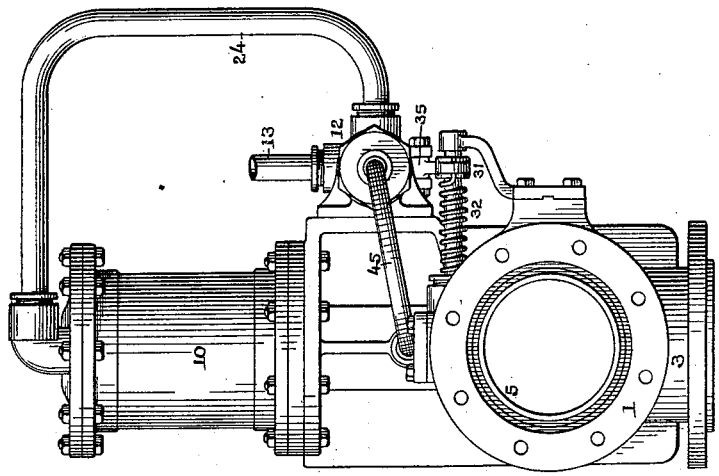

UNITED STATES PATENT OFFICE.

BIRNEY C. BATCHELLER, OF PHILADELPHIA, PENNSYLVANIA.

VALVE MECHANISM FOR PNEUMATIC-TRANSIT PIPES.

SPECIFICATION forming part of Letters Patent No. 568,291, dated September 22, 1896.

Application filed November 11, 1892. Serial No. 451,632. (No model.)

*To all whom it may concern:*

Be it known that I, BIRNEY C. BATCHELLER, a citizen of the United States, and a resident of Philadelphia, Pennsylvania, have invented certain Improvements in Valve Mechanism for Pneumatic-Transit Pipes, of which the following is a specification.

The object of my invention is to provide means for positively actuating a valve or gate which normally closes a pneumatic-transit tube or pipe, but which must be opened for an instant in order to permit of the passage of the carrier, my invention having been devised especially with reference to use in pneumatic-transit systems in which the pipes and carriers are of large size and in which the closing-valve is consequently one possessing considerable bulk and weight.

In the accompanying drawings, Figure 1 is a longitudinal section of sufficient of the discharge end of a pneumatic-transit pipe to illustrate my invention. Fig. 2 is a plan view of the same with part of the device removed. Fig. 3 is an end view looking in the direction of the arrow X, Fig. 1; and Fig. 4 is an enlarged sectional view of certain valve mechanism forming part of the invention.

1 represents part of a pneumatic-transit pipe having a chest 2, with branch 3, communicating with a return-pipe, exhaust apparatus, or outlet, said chest communicating with the interior of the pipe through ports 4, formed, in the present instance, in a sleeve or bushing 5, with which the discharge end of the pipe is provided, although it will be evident that in cases where such bushing is not used the chest 2 may communicate with the interior of the pipe 1 through ports formed directly in said pipe.

A pipe 6 forms a continuation of the pipe 1, said pipe 6, when the device is used at a terminal station, being open at the outer end or communicating with any desired form of receiver into which the carrier is to be discharged, communication between the pipes 1 and 6 being normally closed by a sliding gate or valve 7, which is carried by a rod 8, having at the upper end a piston 9, adapted to a cylinder 10, which is mounted upon suitable brackets formed upon the pipes 1 and 6, these brackets also forming a chamber 11, into which the valve 7 can be lifted when it is desired to open communication between the pipes 1 and 6.

A valve-chest 12 is located at one side of the pipe and cylinder structure just described, and this chest receives air under pressure from any suitable reservoir through a pipe 13, the air being received into the central portion of the valve-chest between pistons 14 and 15 upon a valve-rod 16, as shown in Fig. 4, these pistons fitting snugly to a sleeve or bushing 17, which sleeve or bushing has ports 18 and 19, communicating with chambers 20 and 21 in the valve-chest, the chamber 20 in turn communicating with a pipe 22, leading through a passage 23 to the bottom of the cylinder 10 beneath the piston, and the passage 21 communicating through a pipe 24 and passage 25 with the top of said cylinder. When, therefore, the valve is in the position shown by full lines in Fig. 4, air under pressure passes through the pipe 24 and acts upon the upper side of the piston, so as to depress the same and hold the valve 7 in the closed position, as shown in Fig. 1; but when the valve is shifted to the position shown by dotted lines in Fig. 4 air is directed through the pipe 22 to the bottom of the cylinder 10, and the piston is forced upward so as to raise the valve 7 and permit the advancing carrier in the pipe 1 to escape through the pipe 6, the air above the piston being permitted to escape through the pipe 24, ports 19, and escape-ports 25, formed in the valve-chest 12. On again shifting the valve to the position shown by full lines in Fig. 4 the air is directed to the top of the cylinder and the piston and valve are again depressed, the air beneath the piston escaping through the pipe 22, ports 18, and the end of the valve-chest.

In order to provide for the automatic operation of the valve which controls the flow of air to and from the cylinder 10, means for effecting the mechanical operation of said valve by the carrier may be used in addition to a pneumatic device for operating said valve, or, if desired, the latter device may be used in some cases as a substitute for one of the mechanical devices.

The means for effecting the mechanical operation of the valve by means of the carrier comprise certain fingers projecting into the pipe, so as to lie in the path of the carrier, these fingers being combined with means for transmitting their movement to the valve. One of these fingers is represented at 26 in Fig. 1, said finger being hung to a rock-shaft 27, contained in a box or chest 28, formed upon one side of the pipe, said finger having lugs 29, which, by contact with a stop 30 at one end of the chest, serve to limit the movement of the finger in either direction.

The rock-shaft 27 carries at its outer end a lever 31, which is acted upon by a spring 32, the tendency of the latter being to maintain the finger 26 in the position shown in Fig. 1, that is to say, projecting into the tube 1, so as to be struck by the advancing carrier. The other arm of the lever 31 is connected by a rod 33 to a slotted link 34, which engages with a pin upon one arm of a lever 35, the other arm of said lever being adapted to engage either with the stem of the valve, as shown in Fig. 4, or with a continuation of the same, so that when the toe 26 is pressed forward by the advancing carrier said lever 35 will move the valve from the position shown by full lines in Fig. 4 to that shown by dotted lines in said figure, and will hence provide for the admission of air beneath the piston, so as to raise the valve 7 and permit the carrier to pass from the pipe 1 into the pipe 6, the lever 35 being restored to its normal position by the action of the spring 32 as soon as the carrier has passed the finger 26.

In connection with the pipe 6 is used a finger and appurtenances precisely similar to those described in connection with the pipe 1, the corresponding parts being numbered, respectively, 26$^a$, 27$^a$, 28$^a$, &c., and the lever 35$^a$, forming part of this mechanism, acting upon the outer end of the valve-stem and serving to restore said valve to the position shown by full lines in Fig. 4, when the carrier passes the finger 26$^a$, so as to provide for directing the air to the top of the cylinder 10 and closing the valve 7. In some cases, however, it may be advisable to supplement the action of the mechanical devices described by a pneumatic-valve mover, such as I have shown, this device consisting of a chest 36, forming a continuation of the valve-chest 12 and bored out at its outer end to receive a piston 37, having a rod 38 in line with the spindle 16 of the valve.

The piston 36 is acted upon by a spring 39, bearing at one end against the piston and at the other end against an adjustable collar or ring 40, which can slide in the chest 36, pins 41 on said collar projecting through slots 42 in the chest and being acted upon by a screw-ring 43, adapted to a threaded exterior portion of the chest, so that by turning said ring the slide 40 can be moved in one direction or the other and the tension of the spring 39 thereby governed.

The outer end of the chest 36 has a cap 44, to which is confined one end of the bent pipe 45, the opposite end of which which communicates with the chamber 11, provided for the reception of the valve 7. When, therefore, the front end of the carrier passes the ports 4 in the pipe 1, air is compressed between said front end of the carrier and the valve 7, and this compressed air is conveyed by the pipe 45 to the outer end of the chest 36 and acts upon the piston 37, so as to move the same forward and shift the valve from the position shown by full lines to that shown by dotted lines in Fig. 4, the piston being restored by the spring 39 to its normal position as soon as the pressure in advance of the head of the piston is relieved by the opening of the valve 7. The compression of the air in front of the advancing carrier also has the desirable effect of cushioning the latter, so as to check its speed in some measure, and thereby prevent the violent expulsion of the carrier from the pipe 6 or into the receiver provided for it.

I am aware that it has been proposed to open a cut-off valve in a conveyer-pipe by means of a piston acted upon by air compressed in advance of the carrier, but in such case means must be provided for storing the air and for cutting off communication between the storage vessel and the conveyer-pipe in order to prevent the lowering of the pressure when the cut-off valve is opened. In my case, however, the air compressed in advance of the carrier has no action upon the cut-off-valve-operating piston, but simply serves to move a valve which governs the flow of an independent volume of air into and from the cylinder containing said piston.

It will be evident that various forms of governing-valves could be used for the purpose, but that selected for illustration is preferred, as it is easy to operate and is effective in action.

Having thus described my invention, I claim and desire to secure by Letters Patent—

1. The combination of a pneumatic-transit pipe, a gate closing the same, a cylinder having a piston connected to said gate, a communication between said cylinder and an air supply independent of that in the transit-pipe, a valve for opening and closing said communication, and mechanism under control of the carrier whereby said valve is moved in one direction by the carrier as it is approaching the gate, and in the opposite direction by the carrier as the latter is leaving the gate, substantially as specified.

2. The combination of a pneumatic-transit pipe, a valve or gate for closing the same, a cylinder having piston connected to said gate, a chest connected with a supply of air independent of that in the transit-pipe, a valve in said chest for governing the flow of said air into and from the cylinder, a supplementary chest having a piston with rod for operating said governing-valve, and a communication between the latter chest and the transit-pipe whereby air compressed in advance of the carrier is caused to act upon the piston in said supplementary chest and automatically operate the valve which governs the flow of air from the independent supply to the cylinder containing the piston which operates the gate in the transit-pipe, substantially as specified.

In testimony whereof I have signed my name to this specification in the presence of two subscribing witnesses.

BIRNEY C. BATCHELLER.

Witnesses:
 FRANK E. BECHTOLD,
 JOSEPH H. KLEIN.